United States Patent
Renner

(10) Patent No.: US 6,959,261 B2
(45) Date of Patent: Oct. 25, 2005

(54) SYSTEM FOR TRACKING AND ASSESSING CHANGES IN TECHNICAL PROCESSES

(76) Inventor: Peter Renner, Heiligenstock 2, D-51515 Kürten (DE)

( * ) Notice: Subject to any disclaimer, the term of this patent is extended or adjusted under 35 U.S.C. 154(b) by 26 days.

(21) Appl. No.: 10/669,950

(22) Filed: Sep. 24, 2003

(65) Prior Publication Data

US 2004/0098233 A1 May 20, 2004

(30) Foreign Application Priority Data

Sep. 27, 2002 (EP) .................................. 02021582

(51) Int. Cl.$^7$ ............................................. G06F 15/00
(52) U.S. Cl. ...................... 702/179; 702/182; 702/183; 702/184; 702/185; 714/1; 714/48; 714/55; 714/57; 714/49
(58) Field of Search ....................... 702/179, 182–185; 714/1, 48, 55, 57, 49

(56) References Cited

U.S. PATENT DOCUMENTS

| | | | |
|---|---|---|---|
| 5,339,257 A | * 8/1994 | Layden et al. | ................. 702/84 |
| 5,365,787 A | * 11/1994 | Hernandez et al. | ........... 73/660 |
| 5,561,610 A | * 10/1996 | Schricker et al. | ........... 702/185 |
| 5,838,561 A | * 11/1998 | Owen | .......................... 700/32 |

* cited by examiner

Primary Examiner—Michael Nghiem
Assistant Examiner—Stephen J. Cherry
(74) Attorney, Agent, or Firm—Charles L. Schwab; Nexsen Pruet, LLC

(57) ABSTRACT

A system for tracking changes in technical processes, machines or the like having measurement chains for acquiring measured data, having sensors, sensor lines and interpretation electronics, and having governing software. Interdependent measured quantities are combined into measurement groups, the measurement groups are linked with reference quantities, validity conditions are defined for the measured data, and the measured data is utilized only if the validity conditions are fulfilled. The measured data are examined for errors in the instrumentation. For serious, suddenly occurring malfunctions, an alarm is issued, and malfunctions are reported to the operators.

8 Claims, 3 Drawing Sheets

SYSTEM FOR TRACKING AND ASSESSING CHANGES IN TECHNICAL PROCESSES

BACKGROUND OF THE INVENTION

This invention relates to a system for tracking and assessing changes in technical processes, machines, installations and the like. Tracking and assessing changes in processes is a prerequisite for evaluating the condition of a machine or installation. If such changes are detected promptly, major damage can be prevented by taking maintenance actions promptly before major damage associated with extended downtime occurs. The invention aims to contribute to better utilizing machines and installations, prolonging their service life, improving reliability, preventing the loss of valuable goods, optimizing experimental results, and reducing the use of energy.

In a drive shaft with a plurality of bearings, small changes in the temperature values at the bearing positions are significant for the anticipated service life. The difficulty is that the temperature values are not constant. They vary with the rotation speed of the shaft, the radial force acting on the individual bearing positions, and the ambient temperature. It therefore does not appear possible to track small changes that are relevant to the condition of the bearings.

Small leaks in pipelines, for example in water supply, often go undetected. Over time, however, they lead to substantial losses of water, which are not acceptable from either an environmental or a cost standpoint. Because the quantity of water withdrawn is subject to substantial variations, it does not appear possible to track small changes that occur over time.

The pilots of aircraft must observe a number of instruments at the same time. This easily leads to excessive stress, especially as the flight situation demands full attentiveness. Small changes that are relevant to safety may thus fail to be detected.

Long-time trials are frequently performed in research and development. In product development, trials must be carried out over an extended time before any evaluation of service life is possible. It would be very helpful if trends permitting an inference about the service life could be detected at an early point in time.

These examples have in common that technical processes, machines and installations are acted on by influences that manifest themselves in the measured data but are not changes in the process itself. The measured data are comparable and therefore cannot be employed for interpretation relative to small changes. Trends due to small changes thus cannot be tracked.

OBJECTS AND SUMMARY OF THE INVENTION

It is an object of the invention to eliminate the unknown influences that act on technical processes, machines or installations and manifest themselves in the measured data but cannot be attributed to changes in the process itself, so that values can be obtained that lend themselves to comparison and the identification of trends.

It is a further object of the invention to detect and report serious operational malfunctions that occur suddenly and to filter out errors that result from malfunctions in the instrumentation.

The objects of the invention are achieved in that measurement groups of interdependent measured quantities are formed, validity conditions are defined for the measured data such that the data of the measurement group are valid under these conditions, and that a reference quantity is assigned to each measurement group.

The invention makes it possible to eliminate unknown factors of influence and thus arrive at standardized values. The standardized values can be compared and reveal trends that otherwise would not be detected. Such trends indicate the condition of the machine/installation that makes possible condition-oriented maintenance actions. In this way operational malfunctions are detected that would shortly cause a total outage with serious damage.

For example, the bearing temperatures of the bearings of a drive shaft of a drive machine are in an internal relationship because all bearing positions are subject to the influences such as rotation speed, delivered torque, and ultimately ambient temperature. The bearing temperatures will thus vary under unequal influences without making it possible to infer that the condition of the machine has changed.

Measured quantities are process data or machine data that are acquired via sensors and measurement electronics. Such data are for example temperatures, pressures, flow rates, rotation speeds, etc. The term dependent measured quantities denotes measured quantities that are in an internal relationship in terms of the function or design of a machine or installation.

The results are not usable under all operating conditions. Validity conditions must be defined under which the measurement results of the dependent measured quantities are comparable with earlier measurements and thus valid.

If one considers the previous example of a drive shaft with a plurality of bearings, the bearing temperatures are zero when the machine is at rest and thus self-evidently cannot be used. When a machine has just started, the individual bearing positions have not yet reached the operating temperature. Validity conditions must therefore be devised under which valid results are to be anticipated. For this reason, measured results will be validly further processed only under the validity condition "temperature reached." Such a validity condition can be deemed to hold if for example the mean or the minimum of the bearing temperatures remains constant with allowance for a tolerance during a span of time.

The term reference quantity denotes a quantity to which the dependent measured quantities are related, it not being categorically necessary that the mathematical relation be known. In the example of the bearing temperatures of a drive shaft with a plurality of bearings, the mean or minimum of the temperatures of the bearing positions can be used as reference quantity. The reference is then the difference between the temperatures of the individual bearing positions and the mean or minimum.

A special case of the inventive idea described above is where a measurement group is formed from just one measured quantity. In this case, the measured quantity will also be the reference quantity. One such application might be where pipelines are to be monitored for leaks and only the flow rate is available as measured quantity. Here it is difficult to arrive at results having any informative power.

A further inventive idea comes into play here, which says that the condition quantity for the validity test can be a statistical quantity formed from the dependent measured quantity with a time period as base. Consider the example of the water supply to a district. Water for use is delivered to such a district via a water pipeline in which a water meter is integrated. The water meter in conjunction with the cross section of the pipeline makes it possible to determine the instantaneous rate of flow. On the other hand, it is known that the quantity of water is subject to large variations over a time span of 24 hours and that the water consumption becomes very low during certain nighttime hours. Results having informative power can be obtained by determining, day by day, the minimum value of the water consumption during the time period of 24 hours. If the minimum increases in the course of time, it will be possible to diagnose a leak.

In development of the invention, measurement groups and data sets of measurement groups in which the standardized values or the statistically compressed standardized values are stored are uniquely named.

In development of the invention, the dependent standardized values of the stored data sets of like quantities are compressed into standardized statistical values and time cycles are chosen as base.

Structures having informative power are generated only by the compression of the standardized values into standardized statistical values.

In the example of the bearing temperatures, a comparison of the standardized monthly values with one another can yield definite trends.

It is desirable to configure the compression such that time cycles based on values by the minute, by the hour, by the day and by the month are created. This procedure makes it possible to detect progressive changes that can under certain circumstances lead shortly to a total outage. For example, such changes may be imperceptible in the monthly values but perceptible in the day, hour or minute values.

In the example of the testing of pipelines for leaks in water supply, leaks can be detected by forming a time series of the daily minimum flow rates.

In development of the invention, the standardized statistical values of the individual measurement groups are automatically monitored and are entered in a warning list in case of oddities. Such an oddity occurs if the trend curve of standardized statistical values takes on the character of a straight line that departs from the horizontal with allowance for a tolerance. Such measurement channels are included in the maintenance list with low priority. The maintenance list helps the operating personnel set times for maintenance procedures.

In development of the invention, those standardized statistical values for which the trend curve becomes degressive or progressive or shows abrupt changes are included in the maintenance list with high priority. Such changes indicate that an outage threatens. The system then additionally issues urgent warning messages, which can also be configured as shutdown criteria.

Further, the machines or installations are also protected against suddenly occurring malfunctions. To this end, malfunctions in the instrumentation are detected on the basis of erroneous measured values. Suddenly occurring malfunctions can be initiated by unanticipated failures of components. An example is a chain reaction in which a controller is out of control resulting in overloading of components. According to the invention, this is effected in that the measured values are subjected to a check for malfunctions in the instrumentation and for serious, suddenly occurring operational malfunctions immediately after acquisition, grouping, validity checking and setting off against the reference quantity to yield standardized values.

A malfunction of the instrumentation in the acquisition of measured data can be presumed if a comparison of the last acquired and calculated standardized value with the value of the previously acquired and calculated standardized value yields a value that cannot occur in operation. If for example the bearing temperature of a drive shaft bearing, which changes only slowly, goes to the maximum value in fractions of a second, a malfunction in the measurement chain can be presumed. If the same value becomes significantly smaller, this is an impossible operating condition in which a malfunction in the instrumentation can again be presumed. If such a malfunction occurs, the malfunctioning measurement channel is included in the warning lists. An alarm can additionally be issued to the operating personnel, and the process can be halted.

A serious operational malfunction can be presumed if the comparison reveals a last-acquired and calculated standardized value that does not represent a malfunction in the measurement chain but whose value when compared to the previously acquired and calculated standardized value exhibits a difference that exceeds a limiting value. Such limiting values as a difference between the successively measured calculated standardized values must be established such that they are not exceeded in normal operation when there are no malfunctions. If a serious operational malfunction occurs, the malfunction is included in the warning list with highest priority. An alarm can additionally be issued to the operating personnel, and the process can be halted.

Malfunctions of a sensor often reveal themselves through an increase in the range of variation of the measured values. This is an error that should be detected and remedied as quickly as possible. According to the invention, this is effected by comparing the last-calculated range of variation of the standardized values of a measurement channel with the previously calculated range of variation of the same measurement channel. If a greater range of variation is found, with allowance for a tolerance, a sensor malfunction can be presumed. Such a malfunction of a measurement channel is included in the warning list with high priority.

An outage in the instrumentation can have fatal consequences if the input quantity of a controller is in question. In order to prevent downtime, an average substitute value, which will make possible the continued operation of the installation under restricted conditions, can be prepared.

BRIEF DESCRIPTION OF THE DRAWINGS

The invention will be further explained with reference to exemplary embodiments depicted in simplified form in the drawings, in which:

In FIG. 1, the reference characters have the following meanings:

1 is a process that is being monitored;
2 is a measurement and control unit interfacing between the process and the PCs;
3 are connecting lines between the sensors and actuators of the process and the terminals of the measurement and control unit;
4 is a data network as data link between the measurement and control unit and the PCs;

5 are PCs on which a process instrumentation and control system is installed; and 6 is a PC on which the machine condition monitoring system is installed.

Figure 1:
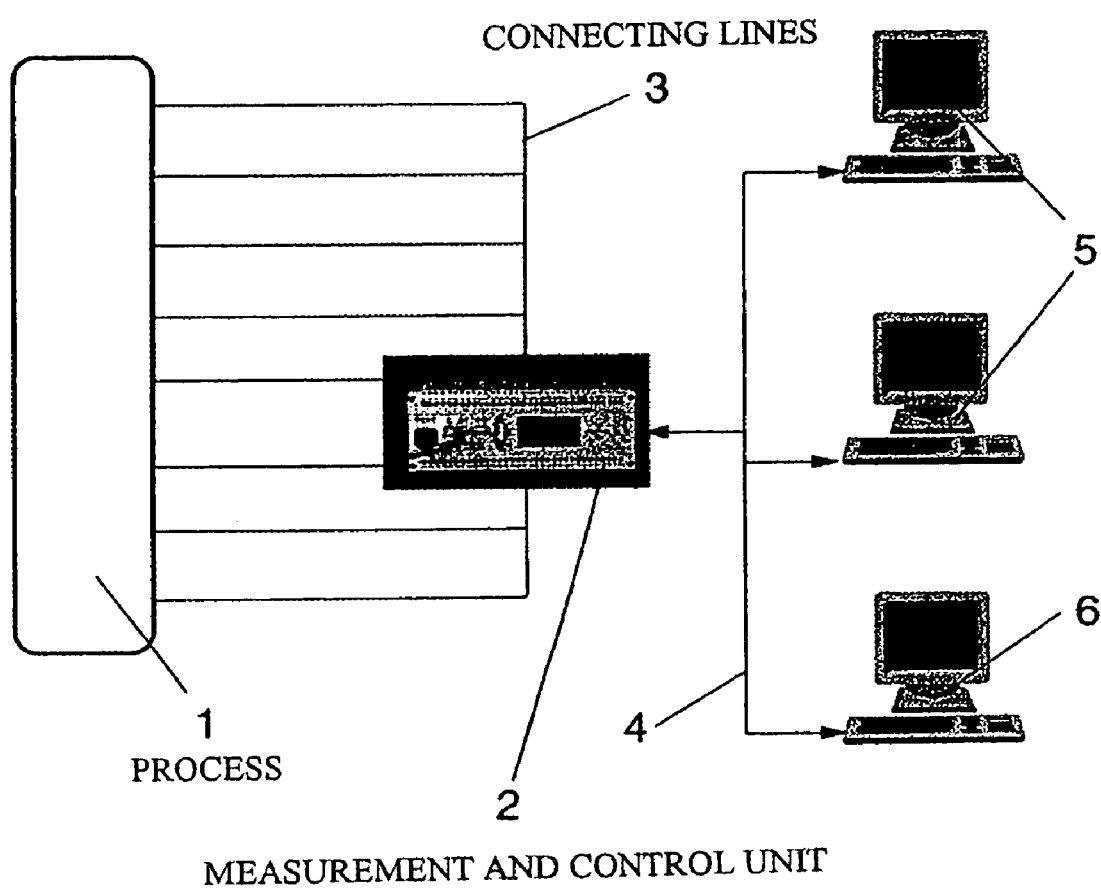
FIG. 1 shows schematically a complete process monitoring system into which the governing software for monitoring the machine condition according to the invention is integrated.

Referring to FIG. 1, the measurement and control unit 2 serves as interface between process 1 that is to be monitored and operated. In process 1 there are sensors and actuators which are connected to the measurement and control unit 2 via the connecting lines 3. The measurement and control unit 2 is in turn connected to the PCs 5 and 6 via the data network 4. Analog and digital signals of the sensors can thus be conveyed to the PCs. A process instrumentation and control system is installed on the PCs 5. This enables operation and observation of the process 1. The governing software of the machine condition monitoring system according to the invention is installed on the PC 6.

Figure 2:
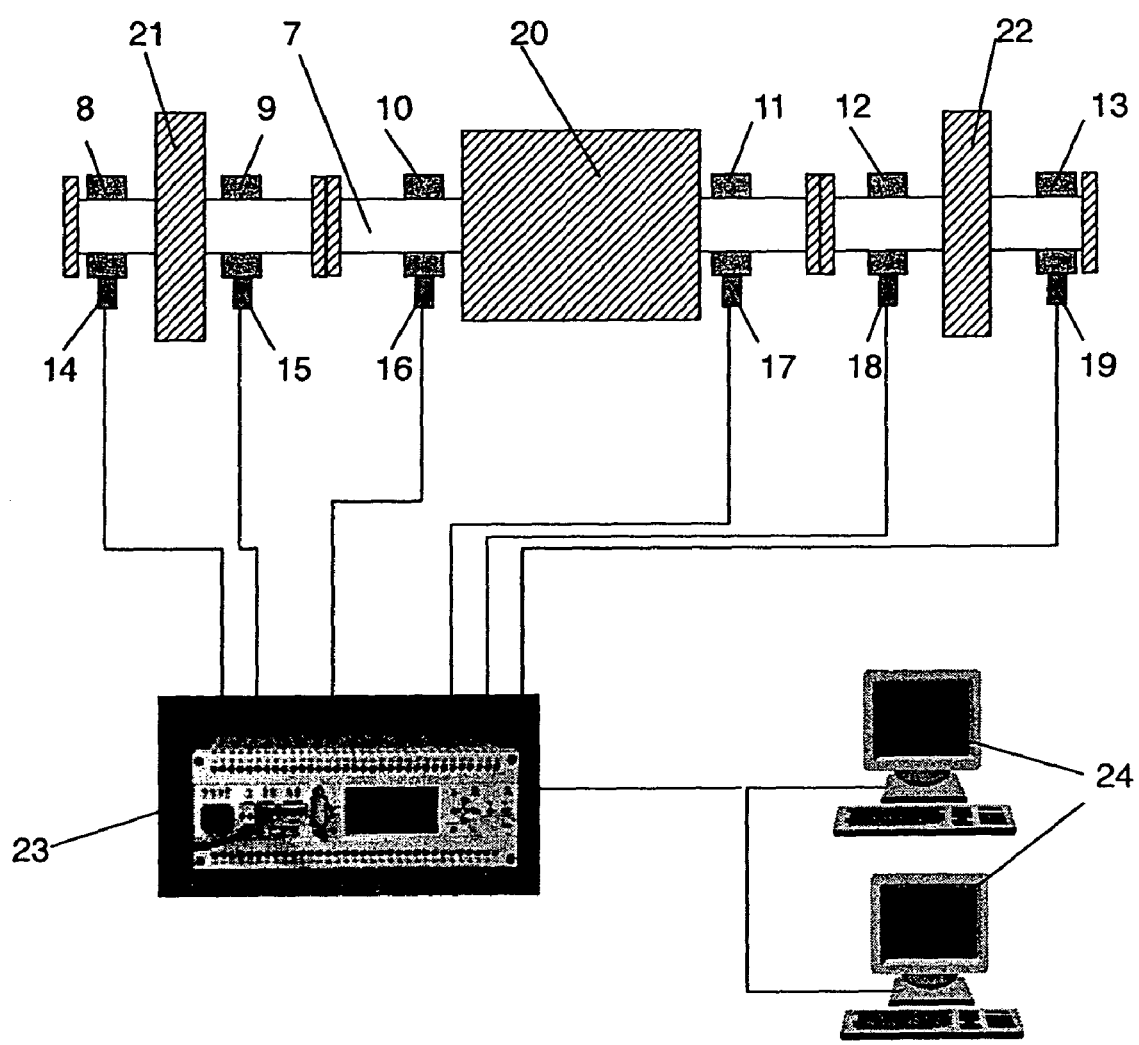
FIG. 2 shows a drive shaft with six bearings having sensors for acquiring the bearing temperatures, having a measurement unit interfacing between the process and the PC for process monitoring and having a PC on which the governing software according to the invention is installed.

In FIG. 2, the reference characters have the following meanings:

7 is a drive shaft;

8 to 13 are bearing positions of the drive shaft;

14 to 19 are sensors that acquire the temperature of the bearing positions;

20 is a drive motor;

21 and 22 are gears for driving connected units, for example air compressors;

23 is a measurement unit interfacing between the temperature and sensors; and 24 are personal computers (PCs) for machine monitoring and process control.

Referring to FIG. 2, the illustrated drive system can serve to drive large pumps, compressors and the like via the gears 21, 22. The electric motor 20 drives the shaft 7. The shaft 7 has six bearings at the bearing positions 8, 9, 10, 11, 12, 13. The sensors 14, 15, 16, 17, 18, 19 serve to acquire the temperatures of the individual bearing positions. The temperature signals are delivered to the measurement interface unit 23 via appropriate lines. Depending on the design of the measurement interface unit 23, it can take over a number of tasks. If the temperature sensors 14, 15, 16, 17, 18, 19 are of thermocouple type, these supply millivolt signals. The measurement interface unit 23 transforms these signals to digital measured values in degrees Celsius. The measured temperature values pass via a data network to the PCs 24. The governing software for the tracking of small changes, in this case changes in the temperature values of the bearing positions 8 to 13, is installed on one of these PCs 24. Such temperature values are not constant. They vary with the rotation speed of the shaft, the radial force acting on the individual bearing positions 8 to 13, and the ambient temperature. It appears impossible to track small changes that are relevant to the condition of the bearings 8 to 13. Small changes in the temperature values of the individual bearings 8 to 13 are significant for the anticipated service life. Progressive temperature changes, even if they are small, point to a coming failure of the bearing. In case of abrupt changes, a crash is imminent. In order to track small changes, the internal relationship in terms of the common rotation speed of the shaft 7 is utilized.

Figure 3:
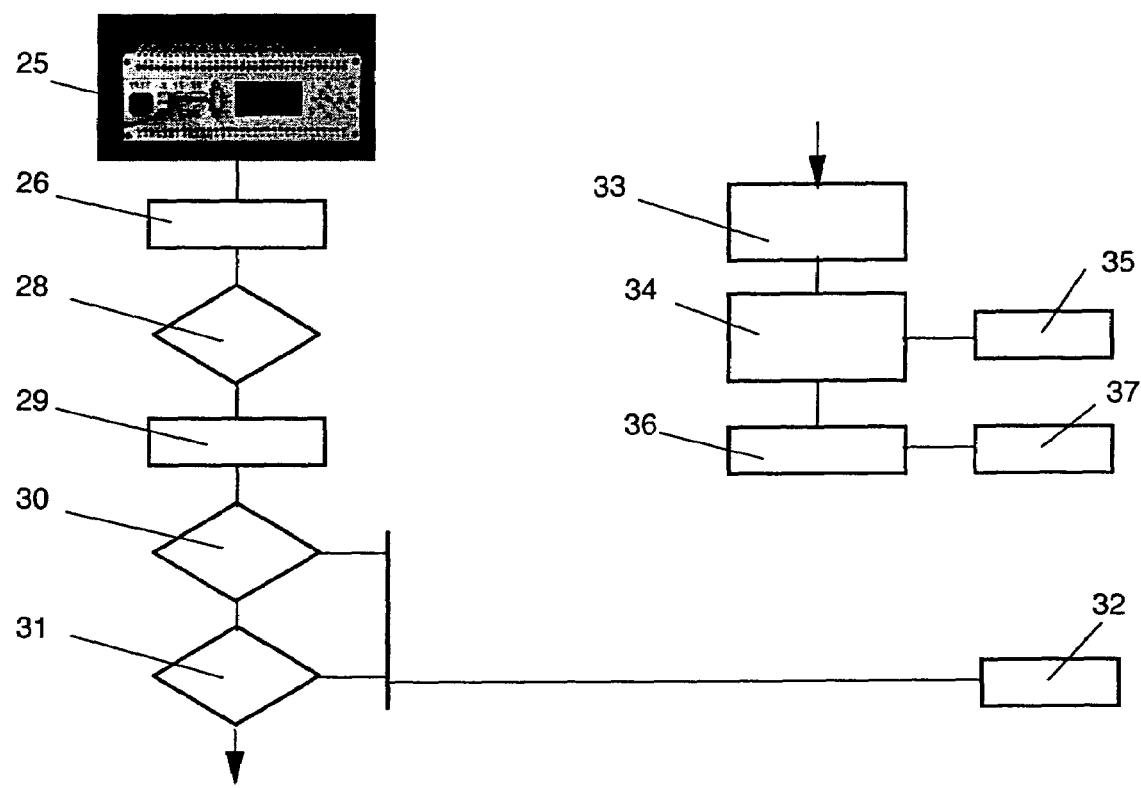
FIG. 3 is a flowchart that shows the mode of functioning of the machine condition monitoring system.

In FIG. 3, the reference characters have the following meanings:

25 is a measurement unit interfacing between the process and the PCs;

26 is a module, "acquire and group measured data." The measured data are read from the interface and combined into groups;

28 is a further module, "check validity conditions." It first calculates the current validity conditions and correspondingly checks the current validity conditions to determine whether the measured data of the group are valid for further processing. The data are discarded if they are not valid;

29 is a third module, "set off measured data against reference value." It first calculates the current reference value and then sets off the measured data of the group against the current reference value. The module generates standardized values;

30 is a fourth module, "check for measurement errors." It checks the standardized values with the aid of criteria that permit the inference of malfunctions in the instrumentation;

31 is a fifth module, "check for operational malfunction." It checks the standardized values with the aid of criteria that permit the inference of serious operational malfunctions;

32 is a warning list as output medium for the operating personnel. Malfunctions in the instrumentation and serious operational malfunctions are included in the warning list;

33 is a sixth module, "compress standardized values." It compresses the standardized values of all measurement groups into minute, hour, daily and monthly values and creates data sets with these values;

34 is a seventh module, "data pool." In this module the data sets of all measurement groups of the standardized statistical values are saved;

35 is an eighth module, "trend output." It enables the operating personnel to view trends of the stored data sets of the data pool;

36 is a ninth module, "look for changes." It examines the compressed standardized statistical values for changes; and 37 is a tenth module, "maintenance list and trend output." It is an output medium. The measurement channels in which changes have been diagnosed are included in the maintenance list and the trends are held ready for retrieval. Thus the user can gain information about the condition of the machine and definitely establish times for maintenance procedures.

Referring to FIG. 3, which is a flowchart for the processing of data for one measurement group, a plurality of measurement groups can be handled at one time. The system is not restricted to temperature measurements. For example, groups for pressure versus time data in the case of pumps and compressors, flow rates of liquid or gaseous media, etc., can be measurement groups. All available measured data that reflect the influence of wear, contamination and corrosion can be included in the system. Thus the user is provided an overall picture of the machine condition and is better able to evaluate the condition of the machine or installation and establish optimal times for maintenance procedures.

The governing software contains a configuration part and a sequence part. In the configuration part, measurement groups are established from the available measurement channels and uniquely named. The sequence in the handling of measured data can be adapted to the prevailing circumstances in versatile fashion through configuration.

The flowchart of FIG. 3 is configured to handle the bearing temperatures of a drive shaft such as shown in FIG. 2. The measurement unit 25 serves as an interface between the process that is to be monitored and evaluated and monitoring devices. In the process there are sensors that are connected to the measurement and control unit 25 via connecting lines. The measurement and control unit 25 is connected via a data network to the PC on which the governing software is installed.

The module 26, "acquire and group measured data," reads the measured data from the interface 25. It forms individual measurement groups that are handled in parallel with and independently of one another. In the user interfaces, modules 32, 35, 37, the data of the measured groups come together again in order to give the user an overall picture independently of the individual measurement groups.

The module 28, "check validity conditions," checks the conditions under which the measured data of the group are valid for further processing. The data are discarded if the conditions are not fulfilled. It is easy to see that the measured data are not relevant if the drive is at rest. In starting, however, when the temperatures are rising from ambient temperature to operating temperature, relevant data are again not guaranteed. A minimum rotation speed in conjunction with a starting time can be provided as criteria for the validity of the measured data. Only when the starting time has elapsed and the rotation speed has exceeded a minimum value are the temperature values usable for further processing because now they vary only slightly. The condition for the validity of the measured values has thus been attained. The condition quantity is formed from the rotation speed and the starting time. The data are released by module 28 for further handling.

The module 29, "set off measured data against reference value," interrelates the measured data of the measurement group. The measured data now present are not yet comparable with one another because they differ in amplitude. For example, the influence of unequal radial forces due to unequal torques during the running time is not compensated. Similarly, the ambient temperature has an influence. In order to eliminate such influences, a reference quantity is introduced. Measured data of the measurement channels of the measurement group are set off against the reference value of the reference quantity in the module 29. The result comprises standardized values for further handling. In the example of the bearing temperatures, the current mean of the individual temperature values of the bearing positions was provided as reference in configuration. The percent difference between the individual temperatures of the bearing positions and the current mean is now the standardized criterion for further processing. The values standardized in this way are subsequently compressed into standardized statistical values and can then be compared over long spans of time. They yield reliable information about tiny changes that otherwise would not be detected.

The module 30, "check for measurement errors," checks the standardized values to determine whether a measurement error is present that permits the inference of a malfunction in the instrumentation. Such errors are characterized, first, by the appearance of a standardized value that is not operationally possible. An example is if the standardized value of a temperature suddenly drops to zero or rises to a maximum value. Errors of this kind point to an open circuit or short circuit usually in the sensor lines. Second, an error in the instrumentation can be diagnosed if the range of variation of the standardized statistical values increases. Such errors are displayed to the user in the warning list 32, where they are labeled as measurement errors, together with a trend plot for the malfunctioning measurement channel. Depending on configuration, such errors can also lead to issuance of an alarm and to shutdown of the machine or installation.

The module 31, "check for operational malfunction," checks criteria that point to a serious operational malfunction. The standardized values have passed the module 30, and so a malfunction in the measurement chain can be ruled out. Now in the module 31 a check is performed to determine whether a discontinuous change has taken place in the standardized values that exceeds an established limiting value. Serious operational malfunctions are displayed to the user in the warning list 32, where they are labeled as serious operational malfunctions, together with a trend plot for the malfunctioning measurement channel. Depending on configuration, serious operational malfunctions can lead to issuance of an alarm and to shutdown of the machine or installation.

The module 33, "create data sets," has the task of statistically compressing the standardized values for which measurement errors were ruled out in the module 30 and serious operational malfunctions were ruled out in module 31. This is effected by compressing the measured data of the individual groups into minute, hour, daily and monthly values. The standardized statistical values of the individual measurement groups are combined into data sets. Thus there will be data sets for minute values, hour values, daily values and monthly values of the measurement group.

The data sets of all measurement groups are combined in the module 34, "data pool." It is commonly not worthwhile to store all the minute values for years. Thus it is the task of the module 34 to make certain, in accordance with the configuration, that the oldest minute, hourly and possibly daily values (according to the user's wish), which are no longer needed for interpretation, are deleted.

The module 35, "trend output", is an output medium. It enables the operating personnel to view trends of the stored data sets of the data pool. Thus the data of all measurement channels can be traced back and graphically plotted over long spans of time. The module 35, "trend output," supplies trends of the measurement channels regardless of whether changes occurred.

In the module 36, "look for changes," the standardized statistical values of the individual measurement channels of all measurement groups are automatically examined for changes. The first step is to check whether a change in the values has taken place. If such a change is detected, an examination is done to determine whether this change is linear with respect to time or whether a progressive behavior is detectable.

In both cases, the measurement channels are included in the module 37, "maintenance list and trend output." The module 37 is an output medium in which the measurement channels for which changes were diagnosed are included and the trends are available and ready for retrieval. Thus the user can gain information about the machine condition and determine times for maintenance procedures.

What is claimed is:

1. A system for tracking changes in technical processes, machines or the like having measurement chains for acquiring measured data, having sensors, sensor lines and interpretation electronics, and having governing software, wherein interdependent measured quantities are combined into measurement groups (module 26), wherein validity conditions are defined for the measured data (module 28), wherein the measured data are utilized only if their validity conditions are fulfilled, wherein the measured data of the measurement groups are linked with reference quantities (module 29) and wherein at least one of the validity conditions for the measured data (module 28) is a statistical quantity formed from a dependent measured quantity or a combination of a plurality of dependent measured quantities with a time period as base.

2. The system for tracking changes of claim 1 wherein at least one of the validity conditions for the measured data (module 28) is a value going higher or lower than a special measured value of a measured quantity or a value going higher or lower than a value that is calculated from a plurality of special measured values of a plurality of measured quantities.

3. A system for tracking changes in technical processes, machines or the like having measurement chains for acquiring measured data, having sensors, sensor lines and interpretation electronics, and having governing software, wherein interdependent measured quantities are combined into measurement groups (module 26), wherein validity conditions are defined for the measured data (module 28), wherein the measured data are utilized only if their validity condition are fulfilled, wherein the measured data of the measurement groups are linked with reference quantities (module 29) and wherein at least one of the validity conditions for the measured data (module 28) is a waiting time that begins upon a value going higher or lower than a measured value of a measured quantity or upon a value going higher or lower than a value that is calculated from a plurality of special measured values of a plurality of measured quantities.

4. A system for tracking changes in technical processes, machines or the like having measurement chains for acquiring measured data, having sensors, sensor lines and interpretation electronics, and having governing software, wherein interdependent measured quantities are combined into measurement groups (module 26), wherein validity conditions are defined for the measured data (module 28), wherein the measured data are utilized only if their validity condition are fulfilled, and wherein the measured data of the measurement groups are linked with reference quantities (module 29) and wherein at least one of the validity conditions for the measured data (module 28) is loading.

5. A system for tracking changes in technical processes, machines or the like having measurement chains for acquiring measured data, having sensors, sensor lines and interpretation electronics, and having governing software, wherein interdependent measured quantities are combined into measurement groups (module 26), wherein validity conditions are defined for the measured data (module 28), wherein the measured data are utilized only if their validity condition are fulfilled, wherein the measured data of the measurement groups are linked with reference quantities (module 29), and wherein standardized values of the same measurement group are compressed into standardized statistical values and wherein time values are provided as basis for said standard statistical values.

6. The system for tracking changes of claim 5 wherein the time values are a selection of the common time quantities such as seconds, minutes, hours, days, weeks, months, years.

7. The system for tracking changes of claim 5 wherein those standardized statistical values for which the trend curve of the standardized statistical values has taken on the character of a straight line whose angle, with allowance for a tolerance, deviates slightly from the horizontal are included in a maintenance list (module 37) with low priority.

8. The system for tracking changes of claim 5 wherein those standardized statistical values for which the trend curve is degressive or progressive or shows abrupt changes are included in a maintenance list (module 37) with high priority.

* * * * *